United States Patent [19]
Michelot et al.

[11] Patent Number: 6,076,578
[45] Date of Patent: Jun. 20, 2000

[54] DEVICE ENABLING A MOTOR VEHICLE TO RUN ON A FLAT TIRE

[75] Inventors: Eric Michelot, Cergy; Bruno Pelletier, Villers Sous Saint-Leu, both of France; Pascal Seradarian, Lawrenceville, N.J.

[73] Assignee: Hutchinson, Paris, France

[21] Appl. No.: 08/944,730

[22] Filed: Oct. 6, 1997

[30]   Foreign Application Priority Data

Oct. 7, 1996 [FR] France ................................ 96 12176

[51] Int. Cl.⁷ .................................................. B60C 17/06
[52] U.S. Cl. .......................................... 152/158; 152/520
[58] Field of Search .................................. 152/155, 157, 152/158, 520

[56]   References Cited

U.S. PATENT DOCUMENTS

| | | | |
|---|---|---|---|
| 2,040,645 | 5/1936 | Dickinson | 152/520 |
| 3,142,326 | 7/1964 | Lindley | 152/158 |
| 4,163,466 | 8/1979 | Watts . | |
| 5,593,520 | 1/1997 | Boni et al. | 152/158 |

FOREIGN PATENT DOCUMENTS

| | | |
|---|---|---|
| 297984 | 1/1989 | European Pat. Off. . |
| 600771 | 6/1994 | European Pat. Off. . |
| 679544 | 11/1995 | European Pat. Off. . |

OTHER PUBLICATIONS

*Patent Abstracts of Japan*, vol. 13, No. 55, Feb. 8, 1989, Japanese Publication No. JP 63 263106, publication date Oct. 31, 1988.

*Primary Examiner*—Michael W. Ball
*Assistant Examiner*—Barbara J Musser
*Attorney, Agent, or Firm*—Alston & Bird LLP

[57]   ABSTRACT

A device enabling a motor vehicle to run on a flat tire, the device comprising a running ring made of elastomer and mounted tightly on the rim of the wheel inside the tire, the running ring being largely overdimensioned in radial height, in width or axial dimension, and in mass, and its radially-projecting annular portion is offset towards the inside of the vehicle to form protection for the occupants of the vehicle against the explosion of a mine triggered by passage of the wheel.

3 Claims, 3 Drawing Sheets

DEVICE ENABLING A MOTOR VEHICLE TO RUN ON A FLAT TIRE

The invention relates to a device enabling a motor vehicle to run on a flat tire, in particular a military vehicle having wheels with a removable rim, i.e. a rim including a margin that can be removed or a rim made up of two portions that are fixed to each other.

BACKGROUND OF THE INVENTION

Devices have already been proposed for enabling motor vehicles to run on a flat tire, which devices are constituted by an elastomer ring mounted on the rim of a wheel inside the pneumatic tire fitted to the wheel, the elastomer ring having an annular base clamped onto the rim and holding the beads of the tire pressed against the margins of the rim, and a radially-projecting annular portion extending towards the tread of the tire and serving, in the event of a severe loss of pressure in the tire, as an abutment for pressing against the zone of the tread of the tire which is in contact with the ground, and preventing the walls and the tread of the tire being crushed or damaged by the margins of the rim, thereby enabling the driver of the vehicle to keep on driving without having to stop immediately to change the wheel.

Until now, attempts have been made to reduce the size of these "running rings" as much as possible, both with respect to the radial extent thereof inside a tire and with respect to the width or axial extent thereof so as to diminish their weight and their cost while retaining the possibility of running at least several tens of kilometers on a flat tire and at a speed of at least 50 km/h to 60 km/h under acceptable conditions of safety.

It has thus been possible, for private vehicles, to develop flat tire running devices that are lightweight (a few kilograms) and that provide very high performance since they make possible to travel more than 150 km at a speed of about 80 km/h while retaining good road handling when cornering and braking, to such an extent that the driver of the vehicle is not always aware of running on a flat tire.

Flat tire running devices of this type have also been developed for military vehicles, comprising running rings that are heavier and more robust than those for private vehicles, but that have nevertheless been lightened and reduced in size as much as possible in order to reduce cost and avoid degrading vehicle mobility.

OBJECTS AND SUMMARY OF THE INVENTION

An object of the invention is to modify those known flat tire running devices so as to give them a function of protecting the occupants of a vehicle when passing over a mine, while still retaining their normal function of running on a flat tire.

To this end, the invention provides a device for enabling a motor vehicle to run on a flat tire, the device comprising an elastomer running ring which is tightly mounted on the rim of a vehicle wheel and which has an annular base extending over the rim between the beads of the tire, holding them pressed against the margins of the rim, and an annular portion projecting radially from said base to support the tread of the tire in the event of the tire deflating, wherein said projecting annular portion is overdimensioned in mass and in size and is offset axially towards the inside of the vehicle to form protection against the explosion of a mine triggered by passage of the wheel, by absorbing part of the shockwave of the explosion, by reflecting part of the shockwave away from the vehicle, and by protecting the occupants of the vehicle against mine fragments.

The overdimensioning of the flat tire running ring and positioning it on the wheel rim towards the inside of the vehicle make it possible to establish effective protection for the passengers of the vehicle against the explosion of a mine, while conserving the ability to run on a flat tire after the mine has exploded.

Typically, the overdimensioning of the mass of the running ring is at least 100%, and preferably about 200%.

The overdimensioning in radial height of the running ring is at least 50% and is preferably about 70% to 80%.

The overdimensioning in width (i.e. parallel to the axis of the wheel) of the radially-outer portion of the running ring is at least 50%.

Also, the outside radial face of the projecting annular portion of the running ring is concave.

In a preferred embodiment of the invention, the running ring is made of polyisoprene-polybutadiene (IRBR) and is reinforced by at least one sheet of turns of cord in its annular base and by superposed layers of cloth, e.g. polyamide, in its radially-projecting annular portion.

These flat tire running devices are designed to be fitted to wheels having removable rims, i.e. wheels having rims comprising a removable margin or built up of two portions that are fixed to each other, the running ring having an inside diameter substantially equal to the outside diameter of the rim and its width or axial dimension at its base being slightly greater than the distance between the beads of the tire mounted on the wheel, such that the running ring, once mounted on the rim with the tire, is compressed in the axial direction between the beads of the tire and in the radial direction on the wheel rim, thus making it possible to hold the beads of the tire pressed firmly against the margins of the rim and to mount the running ring in fixed manner on the rim by radial clamping and without it being necessary, for this purpose, to use any special clamping or tensioning means or tools.

In general, the invention makes it possible to provide effective protection at low cost for the occupants of a vehicle against the explosion of a mine triggered by the passage of a wheel of the vehicle, and using for this purpose a flat tire running device which enables the vehicle to carry on for a certain distance after the mine has exploded, said device being obtained by overdimensioning a known device at least by about 50% in its radial and axial dimensions.

BRIEF DESCRIPTION OF THE DRAWINGS

The invention will be better understood and other details, characteristics, and advantages thereof will appear more clearly on reading the following description, made by way of example and given with reference to the accompanying drawings, in which.

MORE DETAILED DESCRIPTION

Figure 1:
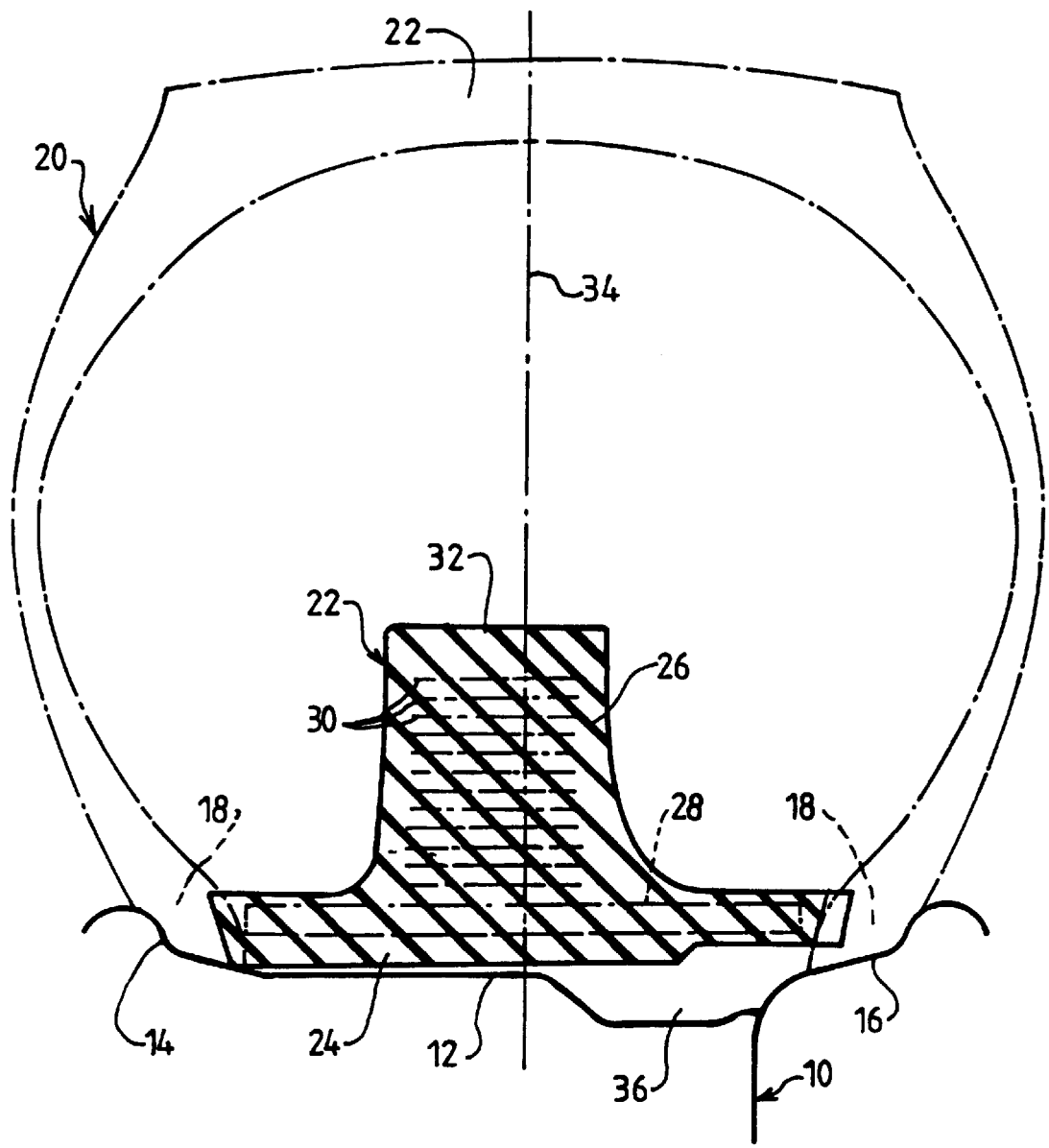
FIG. 1 is a fragmentary diagrammatic axial section view of a known flat tire running device shown mounted on the rim of a motor vehicle wheel.

Reference is made initially to FIG. 1 which is a fragmentary diagrammatic view of a known type of flat tire running device manufactured by the Applicant and fitted on a wheel 10 whose rim 12 has a fixed lateral margin 14 and a removable lateral margin 16, with the beads 18 of a tire 20 shown in chain-dotted lines bearing against the margins.

The flat tire running device of FIG. 1 is constituted by a ring 22 of elastomer comprising an annular base 24 and an annular portion 26 projecting radially from the base 24, said projecting portion 26 extending towards the tread 22 of the tire.

The ring 22 is made of an elastomer such as polyisoprene-polybutadiene (isoprene rubber-butadiene rubber, IRBR) and it is reinforced in its base 24 by one or more sheets of substantially inextensible cords that are spiral-wound (as in a power transmission belt), and in its radial portion 26 by superposed layers 30 of cloth, e.g. made of polyamide.

The inside diameter of the base 24 is substantially equal to the outside diameter of the rim 12 and its width or size parallel to the axis of the wheel 10 is slightly greater than the distance between the beads 18 of the tire when pressing against the margins 14 and 16 of the rim so that when the ring 22 is put into place on the rim 12 between the beads 18 of the tire, the rim is compressed in the axial direction and exerts pressure on the beads 18 of the tire to press them hard against the margins 14 and 16 of the rim.

This axial compression of the base 24 of the ring 22 also has the effect of clamping the ring radially against the wheel rim 12 because of the sheet(s) of cords 28 in the base 24 of the running ring: by nature, the cords are substantially inextensible (they are generally made of treads of polyamide, of aramid (Kevlar), or the like), so the axial compression of the base 24 cannot give rise to radial expansion of the portion of the base 24 which contains the sheet(s) of cords 28, and therefore gives rise, on the contrary, to a displacement of material radially towards the axis of the wheel, which material thus clamps against the rim 12.

As can be seen in FIG. 1, the radial height of the ring 22 of the rim 12 is relatively small, and less than half the height or internal radial dimension of the tire 20, and the width of the radially-outer face 32 of the ring 22 is also much less than half the width of the tread 22 of the tire. In addition, the ring 22 should ideally be centered on the radial midplane 34 of the wheel (in the example shown in FIG. 1 it is slightly offset towards the fixed inner margin 14 of the rim 12 because of a step 36 in the rim towards its removable outer margin 16).

By way of example, the running ring 22 weighs about 15 kg when it is designed for a wheel having a rim 12 with a diameter of 16½" (419.1 mm) and a width (or dimension parallel to the axis of the wheel) of 8¼" (209.55 mm), with the radial height of the ring 22 relative to the rim 12 being about 90 mm.

In the event of the tire puncturing, such a ring 22 enables a light military vehicle to travel a distance of at least 50 km at a speed of at least 50 km/h over terrain that may be quite rough.

Figure 2:
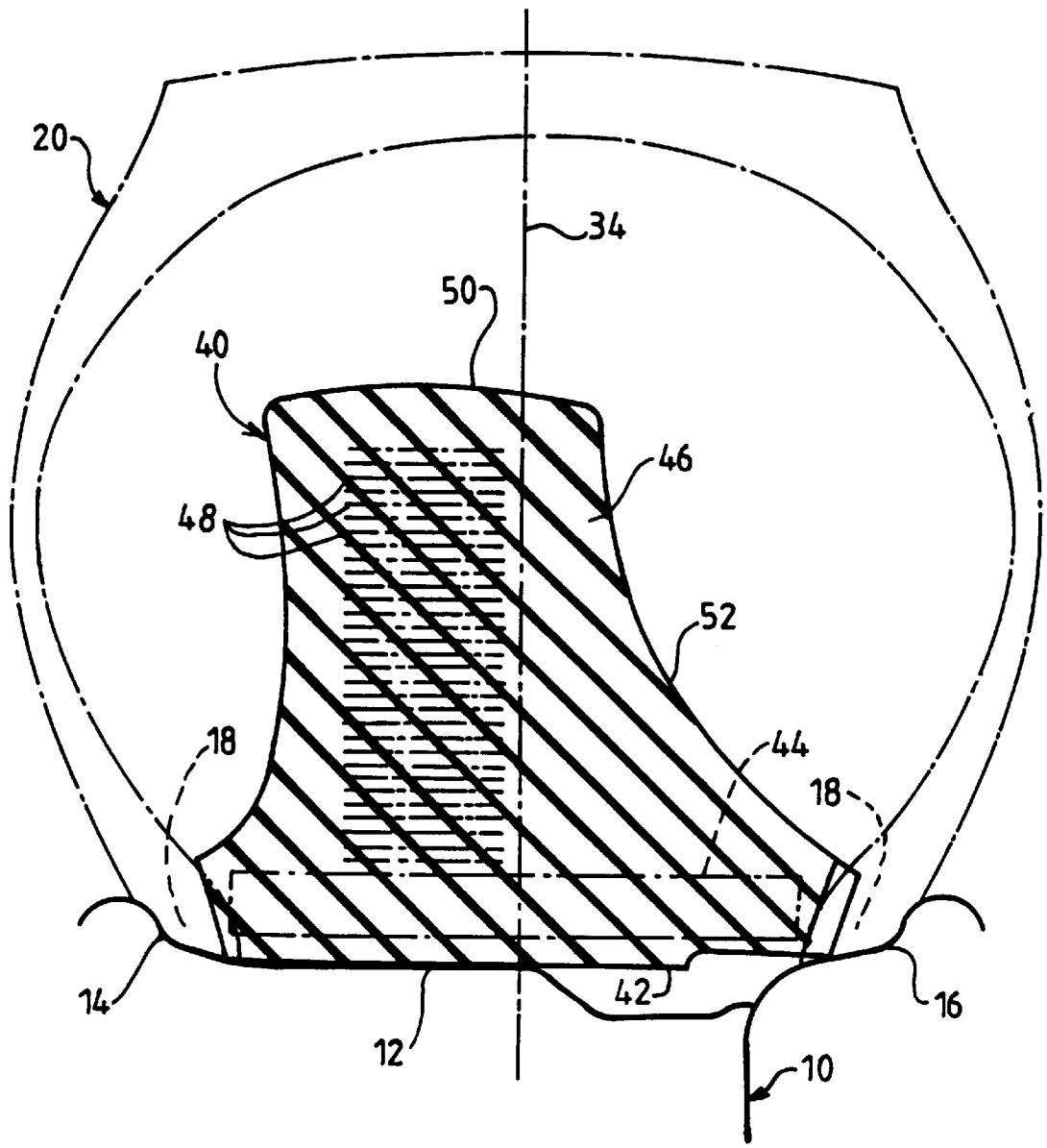
FIG. 2 is a view corresponding to FIG. 1, but showing a flat tire running device of the invention mounted on the rim of FIG. 1.

Reference is now made to FIG. 2 which shows a device of the invention designed to be fitted to the same wheel as that shown in FIG. 1, this device of the invention being constituted by a flat tire running ring 40 derived from the prior art ring 22 by increasing its mass, its radial height, and the width (or axial dimension) of its radially-projecting annular portion.

The ring 40 is made of the same elastomer as the known ring 22 and comprises an annular base 42 pressed against the rim 12 of the wheel 10 and reinforced by one or more sheets 44 of substantially inextensible cords, and an annular portion 46 projecting radially from the base 42 and reinforced by superposed layers 48 of cloth, e.g. made of polyamide, like the above-described ring 22.

However, the weight of the ring 40 of the invention is about 45 kg for a wheel corresponding to the example given above (rim diameter 16½" and rim width 8¼"), the radial height of the ring 40 from the rim 12 being about 160 mm, and the width of its radially-outer face 50 being about 95 mm (whereas that of the ring 22 was about 60 mm).

The overdimensioning of the prior art ring 22 for the purpose of obtaining the ring 40 of the invention is thus 200% concerning its weight, 75% concerning its radial height, and 50% concerning the width of its projecting radial portion.

In addition, the radially-projecting annular portion 46 of the ring 40 is offset axially towards the inside of the vehicle, i.e. towards the fixed lateral margin 14 of the rim 12 relative to the radial midplane 34 of the wheel.

The radial face 52 of the portion 46 of the ring 40 that faces towards the outside of the vehicle is concave in shape.

The width or axial dimension of the base 42 is slightly greater than the normal distance between the beads 18 of the tire when pressed against the margins 14 and 16 of the rim, the inside diameter of the base 42 is substantially equal to the outside diameter of the rim 12, so in the same manner as that described above, when the ring 40 is mounted on the rim 12 inside the tire 20, the base 42 is compressed in the axial direction between the beads of the tire and said base clamps radially on the wheel rim 12.

When the wheel 10 passes over a mine placed on the ground or buried therein, the explosion of the mine gives rise to a shockwave and to the projection of mine fragments. As a general rule, the tire 20 is destroyed by the explosion, however part of the shockwave is reflected away from the vehicle by the radial face 52 of the ring 40 and part of it is absorbed by the mass of elastomer constituting the ring 40. Likewise, some of the fragments are deflected away from the vehicle or are stopped by the ring 40 without destroying it, thereby allowing the vehicle to continue moving with adequate stability over terrain that can be relatively rough.

The flat tire running ring 40 therefore serves to protect the occupants of the vehicle against the explosion of a mine, with this protection being sufficient to avoid the explosion of the mine endangering the life of the occupants.

Overdimensioning of the flat tire running ring 40 is limited by practical considerations: when running on rough ground, the tire 20 inflated to an appropriate pressure must not press or rub against the flat tire running ring 40 on passing over a bump or a hollow, or in the event of sudden braking.

Figure 3:
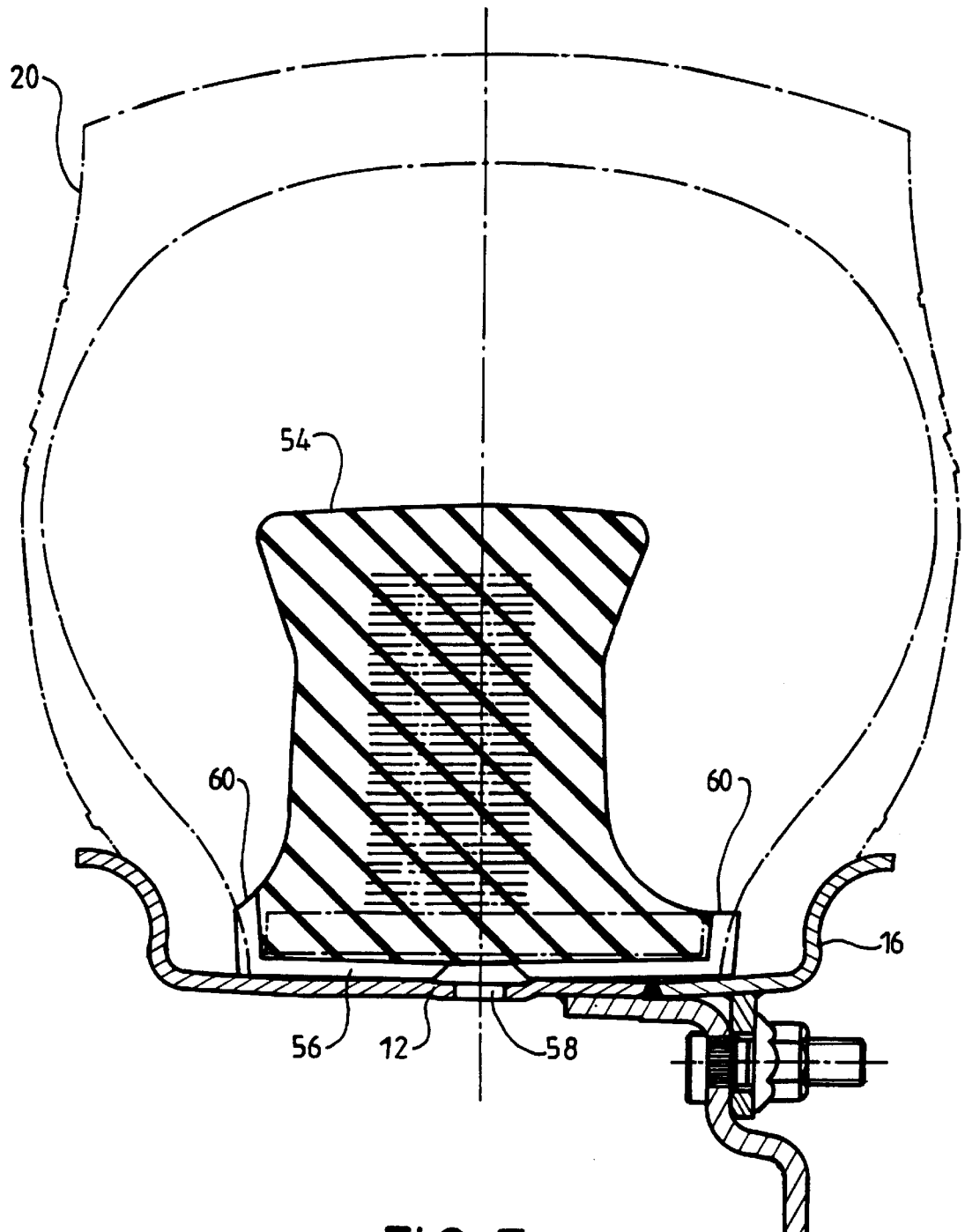
FIG. 3 is a fragmentary diagrammatic axial section view of a variant embodiment of the device of the invention for a wheel of larger size.

Reference is now made to FIG. 3 which is a diagram of a variable embodiment of the device of the invention, intended in this case for fitting to a wheel of greater size, e.g. a wheel having a rim 12 with a diameter of 20" (508 mm) and a width (or axial dimension) of 10" (254 mm).

The device of the invention is constituted by a flat tire running ring 54 having the same general structure as that of FIG. 2, and whose dimensions are as follows:

radial height above the rim 12: about 190 mm;

width (axial dimension) of the radially-outer face: about 165 mm; and weight: about 70 kg.

In the diagram of FIG. 3, there can be seen an axial channel 56 formed in the annular base of the ring 54, and communicating with an opening 58 through the rim 12 to enable a valve to be mounted for inflating the tire 20. The ends 60 of the channel 56 open out into the inside of the tire between its beads and the ring 54 so as to allow inflation air to pass freely.

For greater clarity, FIG. 3 also shows an example of the structure of a rim 12 having a removable margin 16, this kind of rim being well known to the person skilled in the art.

What is claimed is:

1. A device for enabling a motor vehicle to run on a flat tire, the device being mounted within a vehicle tire having opposing beads seated in a vehicle wheel, the wheel, when mounted to a vehicle, having an outside facing the outside of the vehicle and an inside facing inwardly of the vehicle, and the device comprising an elastomer running ring which is tightly mounted on the rim of said vehicle wheel and which has an annular base extending over the rim between the beads of the tire holding them pressed against the margins of the rim, and an annular portion projecting radially from said base to support the read of the tire in the event of the tire deflating, wherein said projecting annular portion is offset axially towards the inside of the vehicle wheel relative to the midplane of the wheel and extends radially outwardly to a radial height which is greater than one-half the internal radial dimension of the tire, and wherein said projecting annular portion has a radially outer face of a width in tile axial dimension which is more than half said radial height, said projecting annular portion thereby providing a substantial mass with an extended radial face which is concave in shape and faces the outside of the vehicle wheel to form protection against the explosion of a mine triggered by passage of the a wheel, by absorbing part of the shockwave of the explosion, by reflecting part of the shockwave away from the vehicle, and by protecting the occupants of the vehicle against mine fragments.

2. A device according to claim 1, wherein the running ring is made of polyisoprene-polybutadiene and is reinforced by at least one sheet of turns of cord in its annular base and by superposed layers of cloth in its radially-projecting annular portion.

3. A device according to claim 1, wherein, for a rim of the removable type, the running ring has an inside diameter substantially equal to the outside diameter of the rim and its annular base is of a width or axial dimension that is slightly greater than the distance between the beads of the tire mounted on the wheel, such that the running ring once mounted on the rim together with the tire is compressed axially between the beads of the tire and radially against the rim.

\* \* \* \* \*

UNITED STATES PATENT AND TRADEMARK OFFICE
CERTIFICATE OF CORRECTION

PATENT NO. : 6,076,578

DATED : June 20, 2000

INVENTOR(S) : Michelot et al.

It is certified that error appears in the above-identified patent and that said Letters Patent is hereby corrected as shown below:

Column 5, line 19, "read" should read --tread--.

Column 6, line 1, "tile" should read --the--; line 6, cancel "a".

Signed and Sealed this

Twenty-second Day of May, 2001

Attest:

NICHOLAS P. GODICI

Attesting Officer

Acting Director of the United States Patent and Trademark Office